F. THOMAS.
Coffee-Roaster.

No. 169,059.  Patented Oct. 19, 1875.

Witnesses:
Heinrich F. Bruns.
L. A. Bunting.

Inventor:
Frederick Thomas
by Lewis L. Coburn
Atty.

UNITED STATES PATENT OFFICE.

FREDERICK THOMAS, OF BLOOMINGTON, ILLINOIS.

IMPROVEMENT IN COFFEE-ROASTERS.

Specification forming part of Letters Patent No. 169,059, dated October 19, 1875; application filed October 1, 1875.

*To all whom it may concern:*

Be it known that I, FREDERICK THOMAS, of Bloomington, county of McLean and State of Illinois, have invented an Improvement in Coffee-Roasters, reference being had to the accompanying drawings, which form a part of this specification.

The object of my invention is to make a more simple, and at the same time efficient, coffee-roaster, and one that can be adapted to any size stove-hole through which it is heated.

My invention consists in the combination of the revolving vessel which contains the coffee, and the partial partition riveted therein, by which the coffee is carried up and agitated as the vessel is revolved. - This shape of the revolving vessel, with the construction of the partial partition, serves to roast the coffee more uniformly, and make a more thorough stirring of it, than has been heretofore accomplished, as hereinafter specified.

My invention further consists of the adjustable legs by which the coffee-roaster is supported and held over the stove-hole, and by which it can be adjusted to stove-holes of various sizes.

Figure 1:
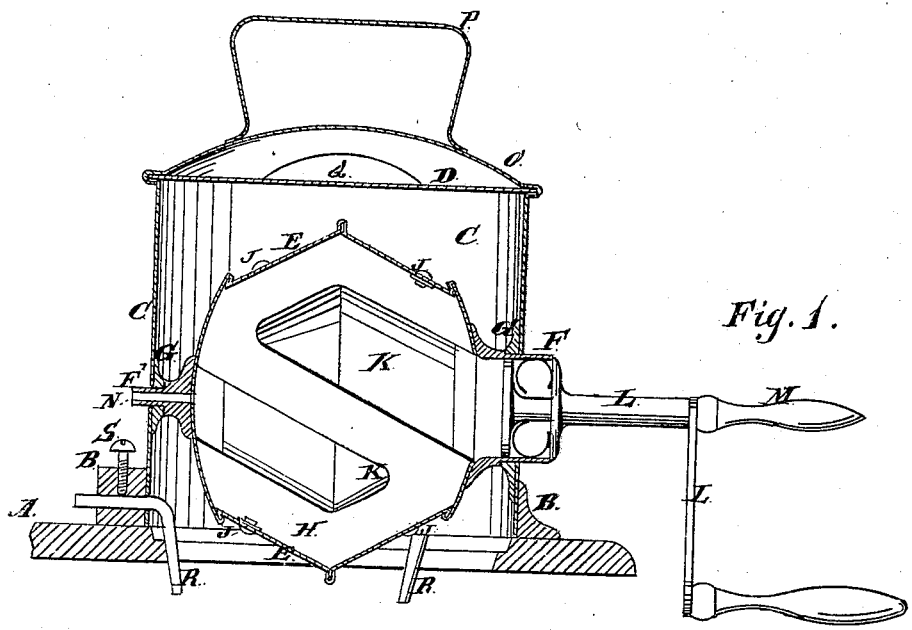
Figure 2:
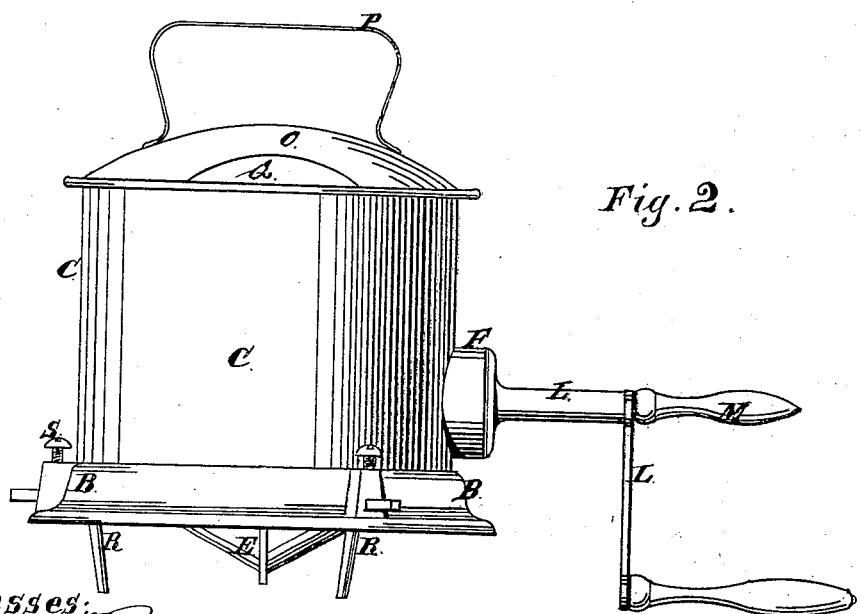

In the accompanying drawings, Figure 1 represents a vertical sectional view of my coffee-roaster, showing the side elevation of the partial partition placed in the interior of the revolving coffee-holder. Fig. 2 represents a side elevation of the roaster complete.

A represents the stove-plate upon which the roaster is placed to roast coffee. B represents a cast-iron ring, to which the supporting parts of the roaster are attached, and which is intended to rest upon the stove-plate when the coffee-roaster is in use. C is a sheet-metal cylinder firmly attached to the cast-iron ring B. It is closed at the top by a plate, D, but is entirely open at the bottom to receive heat directly from the fire in the stove. E is a revolving coffee-holder, provided with journals F F', with bearings G attached to the cylinder C. The coffee-holder is an oblate spheroid in form, with its journals attached to the flattened portion. H is a partial partition fitted to the interior of this oblate spheroid, and provided with flanges I, which are riveted to the spheroid by rivets J. K are openings in this partition H, which admit of the passage of the coffee through them. L is a crank, which slips into the hollow journal F of the spheroid, and is used for revolving it as the coffee is being roasted. M is a handle attached to the crank-shaft for the purpose of removing it and replacing it in the hollow journal. The coffee is put into and removed from the spheroid through the hollow journal F. N is a vent-hole through the journal F' for ventilation of the spheroid, and the escape of smoke therefrom. O is a shield firmly secured to the top of the cylinder C of the coffee-roaster for shielding the handle P, which is attached thereto, from the heat of the coffee-roaster. There are openings Q in this shield to admit of the ventilation of air between it and the plate D. R are bent wrought-iron legs, which pass through the cast-iron ring B. They are held in any desired position by set-screws S. By loosening the set-screws these wrought-iron legs R can be adjusted so as to fit into a stove hole and hold the roaster in position thereon. They also serve as legs to support the roaster when it is removed from the stove.

My coffee-roaster is a light, inexpensive, portable article, adapted to family and camp use.

When the spheroid E is revolved the coffee is carried up on the partition-plate H, and a portion of it falls through the openings K, and some of it strikes upon the middle portion of the partition and falls to the opposite side of the spheroid without passing the openings. The middle portion of the partition H serves as a brace to support and hold in position the two end pieces which carry the coffee up as the spheroid is revolved.

I claim—

1. The combination of the revolving spheroid E and the partition-plate H, made with openings K, as specified and shown.

2. The combination of the revolving spheroid E, the partition-plate H, with openings K, the vent N, and hollow journal G, the openings K in the partition H being opposite the journal and vent, as specified and shown.

3. The combination of the ring B and adjustable legs R, in the coffee-roaster, as and for the purpose specified.

FREDERICK THOMAS.

Witnesses:
  J. GLIMPSE,
  M. F. STEVENS.